(12) United States Patent
Jaber et al.

(10) Patent No.: US 9,147,076 B2
(45) Date of Patent: *Sep. 29, 2015

(54) SYSTEM AND METHOD FOR ESTABLISHING PERPETUAL TRUST AMONG PLATFORM DOMAINS

(71) Applicant: Dell Products L.P., Round Rock, TX (US)

(72) Inventors: Muhammed Jaber, Austin, TX (US); Marshal Savage, Austin, TX (US); Mukund Purshottam Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,460

(22) Filed: Apr. 24, 2014

(65) Prior Publication Data

US 2014/0237262 A1    Aug. 21, 2014

Related U.S. Application Data

(63) Continuation of application No. 13/174,462, filed on Jun. 30, 2011, now Pat. No. 8,738,915.

(51) Int. Cl.
  *H04L 29/06* (2006.01)
  *G06F 21/57* (2013.01)
  *H04L 9/08* (2006.01)

(52) U.S. Cl.
  CPC ............ *G06F 21/575* (2013.01); *G06F 21/572* (2013.01); *H04L 9/0819* (2013.01); *H04L 2209/127* (2013.01)

(58) Field of Classification Search
  CPC .... G06F 21/575; G06F 21/572; H04L 9/0819
  USPC ......................................................... 713/189
  See application file for complete search history.

(56) References Cited

U.S. PATENT DOCUMENTS

| 5,937,063 A * | 8/1999 | Davis ............................ 713/187 |
| 7,376,718 B2 * | 5/2008 | Gould et al. ................... 709/220 |
| 2005/0071677 A1 * | 3/2005 | Khanna et al. ................ 713/201 |
| 2011/0261964 A1 * | 10/2011 | Kahler et al. ................. 380/286 |

* cited by examiner

*Primary Examiner* — Michael S McNally
(74) *Attorney, Agent, or Firm* — Baker Botts L.L.P.

(57) ABSTRACT

A method may include generating a first shared secret for a present boot session of the information handling system and determining if a second shared secret existed for a prior boot session of the information handling system. If the second shared secret existed for the prior boot session, the method may include encrypting the first shared secret with the second shared secret and communicating the first shared secret encrypted by the second shared secret from a first information handling resource to a second information handling resource. If the second shared secret did not exist for the prior boot session, the method may include communicating the first shared secret unencrypted from the first information handling resource to the second information handling resource. The method may additionally include securely communicating between the first information handling resource and the second information handling resource using the first shared secret for encryption and decryption.

22 Claims, 2 Drawing Sheets

SYSTEM AND METHOD FOR ESTABLISHING PERPETUAL TRUST AMONG PLATFORM DOMAINS

CROSS-REFERENCE TO RELATED APPLICATION

The present application is a continuation application of copending U.S. patent application Ser. No. 13/174,462 filed Jun. 30, 2011, which is hereby incorporated by reference in its entirety for all purposes.

TECHNICAL FIELD

The present disclosure relates in general to information handling systems, and more particularly to establishing trust among platform domains in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, it has been assumed that information handling resources within boundaries of an information handling system may assume trust with each other. For example, in a server platform, the basic input/output system (BIOS) and a storage host bus adapter (HBA) of an information handling system may trust each other in exchange of credentials. Many implementations rely on a shared secret between information handling resources, and rely on a likelihood that the shared secret will not be leaked to a malicious entity. Such implementations introduce a security risk, as malicious code executing on an information handling system with a priority greater than that of an operating system may utilize a similar mechanism to manipulate confidential information within a given platform domain. As a specific illustration, in a server implementation, a BIOS may communicate to a service processor through a keyboard control-style (KCS) interface that is also available to code executing on a processor of the information handling system (e.g., an application executed at a higher priority than an operating system). If the BIOS is deemed trustable to the service processor, any entity with knowledge of the architectural implementation may execute malicious code (e.g., at the level of the operating system) posing as the trusted BIOS to gain access to confidential platform information.

SUMMARY

In accordance with the teachings of the present disclosure, the disadvantages and problems associated with failure of a bootloader and/or an operating system in an access controller have been reduced or eliminated.

In accordance with embodiments of the present disclosure, an information handling system may include a processor, a first information handling resource, and a second information handling resource. The first information handling resource may be configured to generate a first shared secret for a present boot session of the information handling system and determine if a second shared secret existed for a prior boot session of the information handling system. If the second shared secret existed for the prior boot session, the first information handling resource may be configured to encrypt the first shared secret with the second shared secret and communicate the first shared secret encrypted by the second shared secret. If the second shared secret did not exist for the prior boot session, the first information handling resource may be configured to communicate the first shared secret unencrypted. The second information handling resource may be configured to receive the first shared secret and decrypt the first shared secret with the second shared secret if the second shared secret existed for the prior boot session. The first information handling resource and the second information handling resource may further be configured to securely communicate during the present boot session using the first shared secret for encryption and decryption of communications.

In accordance with additional embodiments of the present disclosure, a method may include generating a first shared secret for a present boot session of the information handling system and determining if a second shared secret existed for a prior boot session of the information handling system. If the second shared secret existed for the prior boot session, the method may include encrypting the first shared secret with the second shared secret and communicating the first shared secret encrypted by the second shared secret from a first information handling resource to a second information handling resource. If the second shared secret did not exist for the prior boot session, the method may include communicating the first shared secret unencrypted from the first information handling resource to the second information handling resource. The method may further include, at the second information handling resource receiving the first shared secret and decrypting the first shared secret with the second shared secret if the second shared secret existed for the prior boot session. The method may additionally include securely communicating between the first information handling resource and the second information handling resource using the first shared secret for encryption and decryption of communications.

In accordance with further embodiments of the present disclosure, an information handling resource may be configured to generate a first shared secret for a present boot session of an information handling system and determine if a second shared secret existed for a prior boot session of the information handling system. If the second shared secret existed for the prior boot session, the information handling resource may be configured to encrypt the first shared secret with the second shared secret and communicate the first shared secret encrypted by the second shared secret to a second information handling resource. If the second shared secret did not exist for the prior boot session, the information handling resource may be configured to communicate the first shared secret unencrypted to the second information handling resource. The information handling resource may be further configured to securely communicate with the second information handling resource using the first shared secret for encryption and decryption of communications.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
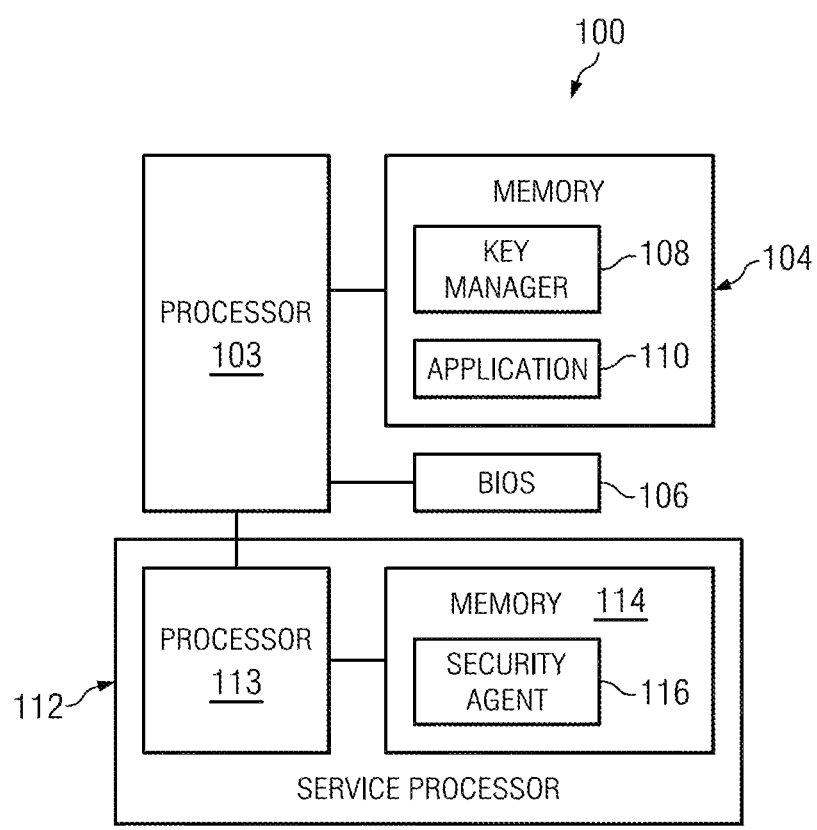
FIG. 1 illustrates a block diagram of an example information handling system, in accordance with certain embodiments of the present disclosure.
Figure 2:
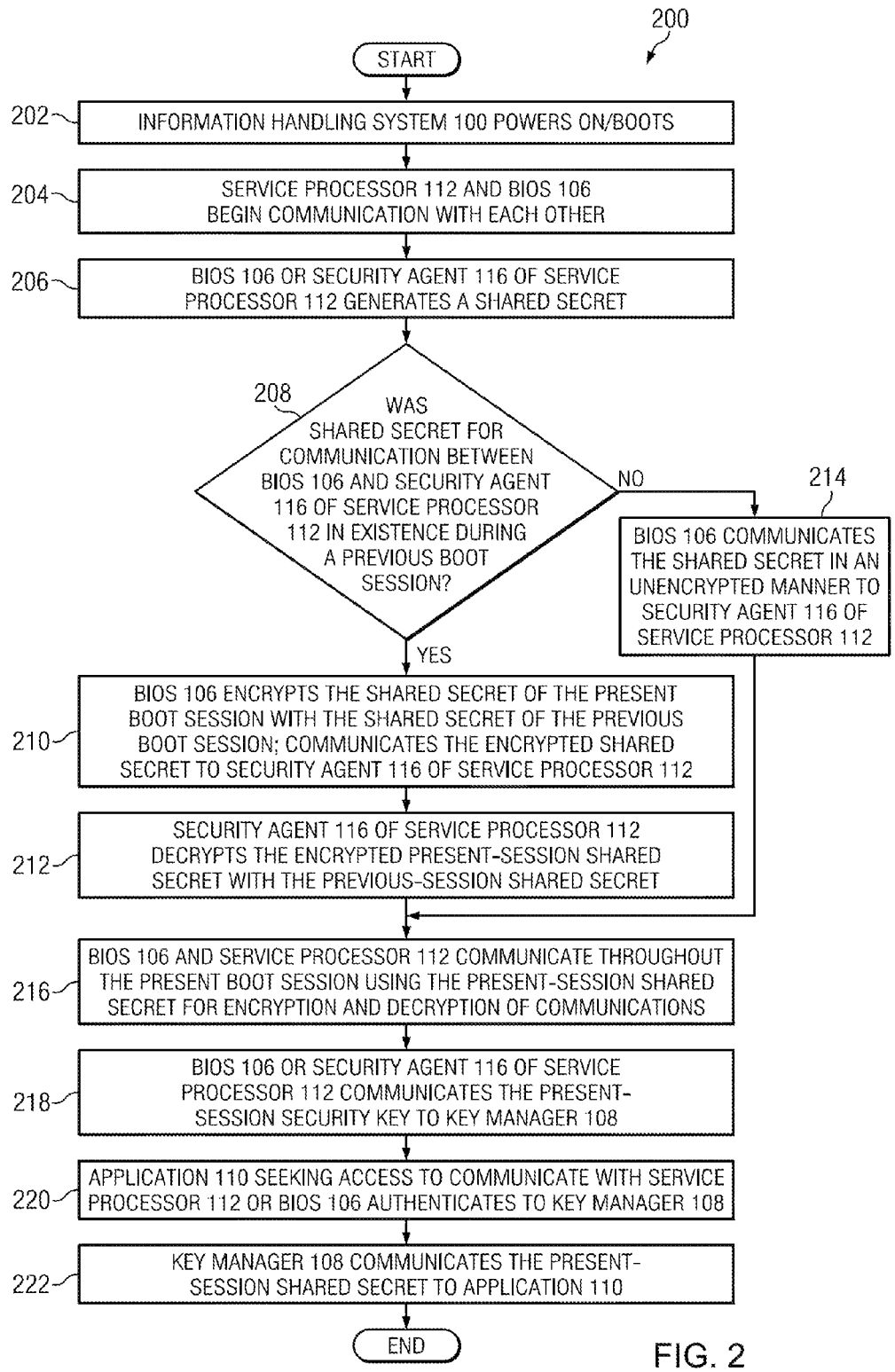
FIG. 2 illustrates a flow chart of an example method for establishing perpetual trust, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, input-output devices and/or interfaces, storage resources, network interfaces, motherboards, and/or any other components and/or elements of an information handling system.

FIG. 1 illustrates a block diagram of an example information handling system 100, in accordance with certain embodiments of the present disclosure. In certain embodiments, information handling system 100 may be a server. In another embodiment, information handling system 100 may be a personal computer (e.g., a desktop computer or a portable computer). As depicted in FIG. 1, information handling system 100 may include a processor 103, a memory 104 communicatively coupled to processor 103, basic input/output system (BIOS) 106 communicatively coupled to processor 103, and a service processor 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 106 and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off.

As shown in FIG. 1, memory 104 may have stored thereon key manager module 108 and one or more applications 110. Key manager module 108 may comprise any system, device, or apparatus configured to maintain secrets that may be used by trusted applications to communicate securely with service processor 112. In some embodiments, key manager 108 may be implemented as a program of instructions that may be read from memory 104 by processor 103 and executed by processor 103 to carry out the functionality of key manager 108. In these and other embodiments, key manager module 108 may be configured to communicate (e.g., via a network communicatively coupled to key manager module 108) with a key manager server (not explicitly shown) that may manage secrets. For example, key manager module 108 of information handling system 100 may authenticate to the key manager server and the key manager server may authorize access of key manager module 108 to secrets. As another example, key manager module 108 of information handling system 100 may communicate secrets to the key manager server and/or request secrets from the key manager server.

An application 110 may include a program of instructions configured to be read and executed by processor 103 to carry out a particular function or task. In some embodiments, an application 110 may include an operating system.

BIOS 106 may be communicatively coupled to processor 103 and may include any system, device, or apparatus configured to identify, test, and/or initialize information handling resources of information handling system 100. In some embodiments, BIOS 106 may be implemented as a program of instructions that may be read by and executed on processor 103 to carry out the functionality of BIOS 106. In these and other embodiments, BIOS 106 may comprise boot firmware configured to be the first code executed by processor 103 when information handling system 100 is booted and/or powered on. As part of its initialization functionality, BIOS code may be configured to set components of information handling system 100 into a known state, so that one or more applications 110 (e.g., an operating system or other application programs) stored on compatible media (e.g., memory 104) may be executed by processor 103 and given control of information handling system 100. In these and other embodiments, BIOS 106 may be further configured to establish trusted communication between service processor 112 and another information handling resource of information handling system 100 (e.g., service processor 112).

Service processor 112 may be communicatively coupled to processor 103 and may include any system, device, or apparatus configured to permit an administrator or other person to remotely monitor and/or remotely manage information handling system 100 (e.g., via an information handling system remotely connected to information handling system 100 via a network) regardless of whether information handling system 100 is powered on and/or has an operating system installed thereon. In certain embodiments, service processor 112 may allow for "out-of-band" control of information handling system 100, such that communications to and from service processor 112 are communicated via a management channel physically isolated from an "in band" communication channel for non-management traffic associated with information handling system 100. Thus, for example, if a failure occurs in information handling system 100 that prevents an administrator from remotely accessing information handling system 100 via its traditional network interface (e.g., operating system failure, power failure, etc.), the administrator may still be able to monitor and/or manage the information handling system 100 (e.g., to diagnose problems that may have caused failure) via service processor 112. In the same or alternative embodiments, service processor 112 may allow an administrator to remotely manage one or parameters associated with operation of information handling system 100 (e.g., power usage, processor allocation, memory allocation, security privileges, etc.). In certain embodiments, service processor 112 may include or may be an integral part of an access controller, baseboard management controller (BMC), Dell Remote Access Controller (DRAC) or an Integrated Dell Remote Access Controller (iDRAC). In these and other embodiments, service processor 112 may be communicatively coupled to processor 103 via a keyboard control-style (KCS) interface bus or another suitable communication bus.

As depicted in FIG. 1, service processor 112 may include a processor 113 and a memory 114 communicatively coupled to processor 113. Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 100. In some embodiments, processor 113 may be similar to processor 103. In other embodiments, processor 113 may be configured specifically for operation with service processor 112.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off. In certain embodiments, memory 114 may store firmware that includes executable instructions to govern operation of service processor 112.

For example, as depicted in FIG. 1, memory 114 may have stored thereon a security agent 116. Security agent 116 may include any system, device, or apparatus configured to establish trusted communication between service processor 112 and another information handling resource of information handling system 100 (e.g., BIOS 106). In some embodiments, security agent 116 may be implemented as a program of instructions that may be read from memory 114 by processor 113 and executed by processor 113 to carry out the functionality of security agent 116. Functionality of security agent 116 may be described in greater detail below in reference to FIG. 2.

FIG. 2 illustrates a flow chart of an example method 200 for establishing perpetual trust in an information handling system, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-222 comprising method 200 may depend on the implementation chosen.

At step 202, information handling system 100 may power on or boot. During power-on/boot, service processor 112 may power up first and wait for BIOS 106 to initialize a bus interface (e.g., a KCS interface) between processor 103 and service processor 112.

At step 204, after a bus interface has been initialized between service processor 112 and BIOS 106, service processor 112 and BIOS 106 may begin communication with each other. Because such communication occurs during a start-up sequence of information handling system 100, service processor 112 may trust with high confidence that it is actually communicating with BIOS 106 (e.g., rather than with a malicious entity) and BIOS 106 may trust with high confidence that it is actually communicating with service processor 112 (e.g., rather than with a malicious entity).

At step 206, one of BIOS 106 or security agent 116 of service processor 112 may generate a shared secret (e.g., a random number, a symmetric key, asymmetric private/private key pair, and/or other suitable secret) for the present boot session. For purposes of simplicity, the remaining description of method 200 will assume that BIOS generates the shared secret. However, in the remaining description, the various key generation, key sharing, and other trust establishment functionality of BIOS 106 and security agent 116 of service processor 112 set forth may be swapped between BIOS 106 and security agent 116 of service processor 112.

At step 208, BIOS 106 may determine if a shared secret for communication between BIOS 106 and security agent 116 of service processor 112 was in existence during a previous boot session. If a shared secret existed in a previous boot session, method 200 may proceed to step 210. Otherwise, if a shared secret did not exist in a previous boot session, method 200 may proceed to step 214.

At step 210, in response to a determination that a shared secret existed in a previous boot session, BIOS 106 may encrypt the shared secret of the present boot session with the shared secret of the previous boot session, and communicate the encrypted shared secret to security agent 116 of service processor 112. In embodiments in which a public/private key pair is used, BIOS 106 may store the private key internally to BIOS 106 and communicate the public key (e.g., encrypted with the private key from the previous boot session) to security agent 116 of service processor 112.

At step 212, in response to receiving the encrypted shared secret from BIOS 106, security agent 116 of service processor 112 may decrypt the encrypted present-session shared secret with the previous-session shared secret. After completion of step 212, method 200 may proceed to step 216.

At step 214, in response to a determination that a shared secret did not exist in a previous boot session, BIOS 106 may communicate the shared secret in an unencrypted manner to security agent 116 of service processor 112. In embodiments in which a public/private key pair is used, BIOS 106 may store the private key internally to BIOS 106 and communicate the public key to security agent 116 of service processor 112.

At step 216, each of BIOS 106 and service processor 112 may communicate throughout the present boot session using the present-session shared secret for encryption and decryption of communications, as appropriate. Accordingly, trust is established that reduces or eliminates the potential for malicious entities to access service processor 112 and/or BIOS 106, as if sensitive information is requested and received by the malicious entity from service processor 112 and/or BIOS 106, such malicious entity is unlikely to have the shared secret required to decrypt such sensitive information. In addition, the trust between BIOS 106 and service processor 112 may be perpetual (e.g., may exist across all boot sessions), as a new shared secret is generated for each boot session, and communication of such new shared secret is protected through encryption using the shared secret of the previous boot session.

At step 218, BIOS 106 or security agent 116 of service processor 112 may communicate the present-session security key to key manager 108.

At step 220, an application 110 seeking access to communicate with service processor 112 or BIOS 106 may authenticate to key manager 108.

At step 222, key manager 108 may, in response to authentication of an application 110 to key manager 108, communicate the present-session shared secret to application 110. Once in possession of the present-session shared secret, application 110 may communicate securely with BIOS 106 and/or service processor 112.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 100 or any other system operable to implement method 200. In certain embodiments, method 200 may be implemented partially or fully in software and/or firmware embodied in computer-readable media.

Although method 200 is depicted as being performed by BIOS 106 and service processor 112, method 200 may be performed by any combination of information handling resources integral to information handling system 100.

In addition, although method 200 describes specifics related to the shared secret as a symmetric key pair, other types of shared secrets, including without limitation, an asymmetric public/private key pair.

Although the present disclosure has been described in detail, it should be understood that various changes, substitutions, and alterations can be made hereto without departing from the spirit and the scope of the disclosure as defined by the appended claims.

What is claimed:

1. An information handling system comprising:
    a processor;
    a service processor;
    a basic input/output system (BIOS);
    a non-transitory memory accessible to the processor;
    a first information handling resource to:
        generate a first shared secret for a present boot session of the information handling system;
        determine if a second shared secret existed for a prior boot session of the information handling system;
        when the second shared secret existed for the prior boot session, communicate the first shared secret encrypted by the second shared secret;
        when the second shared secret did not exist for the prior boot session, communicate the first shared secret unencrypted; and
        securely communicate during the present boot session using the first shared secret for encryption and decryption of communications; and
    a second information handling resource configured to:
    receive the first shared secret;
        when the second shared secret existed for the prior boot session, decrypt the first shared secret with the second shared secret; and
        securely communicate during the present boot session using the first shared secret for encryption and decryption of communications,
    wherein the first information handling resource and the second information handling resource are selected from: the basic input/output system (BIOS) and the service processor.

2. The information handling system of claim 1, wherein the first information handling resource comprises the basic input/output system (BIOS) and the second information handling resource comprises the service processor.

3. The information handling system of claim 1, wherein the first information handling resource comprises the service processor and the second information handling resource comprises the basic input/output system (BIOS).

4. The information handling system of claim 1, further comprising:
    a key manager, the key manager comprising instructions executable by the processor for causing the processor to manage access by applications executing on the processor to at least one of the first information handling resource and the second information handling resource
    at least one of the first information handling resource and the second information handling resource to communicate the first shared secret to the key manager; and
    wherein the key manager authenticates to a key manager server for authorization to access the first shared secret.

5. The information handling system of claim 4, wherein the key manager communicates the first shared secret to the key manager server.

6. The information handling system of claim 4, wherein the key manager requests the first shared secret from the key manager server.

7. The information handling system of claim 1, wherein the first shared secret and the second shared secret each respectively include a key selected from: a symmetric key and a public/private key pair.

8. A method comprising:
    generating a first shared secret for a boot session of an information handling system;
    determining if a second shared secret existed for a prior boot session of the information handling system;
    when the second shared secret existed for the prior boot session:
    encrypting the first shared secret with the second shared secret; and
    communicating the first shared secret encrypted by the second shared secret from a first information handling resource to a second information handling resource;
    when the second shared secret did not exist for the prior boot session, communicating the first shared secret unencrypted from the first information handling resource to the second information handling resource;
    at the second information handling resource:
    receiving the first shared secret; and
    when the second shared secret existed for the prior boot session:
    decrypting the first shared secret with the second shared secret; and
    securely communicating between the first information handling resource and the second information handling resource using the first shared secret for encryption and decryption of communications,
    wherein the first information handling resource and the second information handling resource are included in the information handling system and are selected from: a basic input/output system (BIOS) and a service processor.

9. The method of claim 8, wherein the first information handling resource comprises the basic input/output system (BIOS) and the second information handling resource comprises the service processor.

10. The method of claim 8, wherein the first information handling resource comprises the service processor and the second information handling resource comprises the basic input/output system (BIOS).

11. The method of claim 8, further comprising:
    communicating the first shared secret to a key manager, the key manager instructions executable by a processor included in the information handling system for causing the processor to manage access by applications executing on the processor to at least one of the first information handling resource and the second information handling resource; and
    communicating, by the key manager, the first shared secret to an application authenticating to the key manager, wherein the application communicates with at least one of the first information handling resource and the second information handling resource using the first shared secret for encryption and decryption of communications.

12. The method of claim 11, wherein the application is an operating system executing on the processor.

13. The method of claim 11, wherein the key manager authenticates to a key manager server for authorization to access the first shared secret.

14. The method of claim 13, wherein the key manager communicates the first shared secret to the key manager server.

15. The method of claim 13, wherein the key manager requests the first shared secret from the key manager server.

16. The method of claim 8, wherein the first shared secret and the second shared secret each respectively include a key selected from: a symmetric key and a public/private key pair.

17. Non-transitory computer readable memory media accessible to a first processor, the memory media storing instructions executable by the first processor to:
    generate a first shared secret for a boot session of an information handling system;
    determine if a second shared secret existed for a prior boot session of the information handling system;
    when the second shared secret existed for the prior boot session:
    encrypt the first shared secret with the second shared secret; and
    communicate the first shared secret encrypted by the second shared secret to a basic input/output system (BIOS);
    when the second shared secret did not exist for the prior boot session, communicate the first shared secret unencrypted to the BIOS; and
    securely communicate with the BIOS using the first shared secret for encryption and decryption of communications,
    wherein the first processor and the BIOS are included in the information handling system.

18. The memory media of claim 17, wherein the first processor is a service processor included in the information handling system.

19. The memory media of claim 17, further comprising instructions to:
    communicate the first shared secret to a key manager, wherein the key manager comprises instructions executable by a second processor to manage access by applications executing on the second processor to at least one of the first processor and the BIOS, wherein the key manager communicates the first shared secret to an application authenticating to the key manager, wherein the application communicates with at least one of the first processor and the BIOS using the first shared secret for encryption and decryption of communications,
    wherein the application is an operating system executing on the second processor.

20. The memory media of claim 19, wherein the key manager authenticates to a key manager server for authorization to access the first shared secret.

21. The memory media of claim 19, wherein the key manager communicates the first shared secret to the key manager server.

22. The memory media of claim 19, wherein the key manager requests the first shared secret from the key manager server.

* * * * *